March 7, 1933.   E. J. ROHNE   1,900,737
TOASTER
Filed Feb. 17, 1930   2 Sheets-Sheet 1

INVENTOR
EVEN J. ROHNE
BY
ATTORNEYS

Patented Mar. 7, 1933

1,900,737

UNITED STATES PATENT OFFICE

EVEN J. ROHNE, OF MINNEAPOLIS, MINNESOTA, ASSIGNOR TO WATERS-GENTER COMPANY, OF MINNEAPOLIS, MINNESOTA, A CORPORATION OF MINNESOTA

TOASTER

Application filed February 17, 1930. Serial No. 429,075.

This invention relates to improvements in electrically heated toasters, and also cookers, in general, and among other things provides means for limiting the amount of air which is admitted to the cooking chamber during a cooking or toasting operation, to the end that less air be heated and, therefore, less current be consumed during a given heating period. Means are also provided whereby a limited through-circulation can be maintained without burning the toast. The invention includes constructions providing for the limited admission of air into the heating chamber and the circulation of this air in a manner to distribute it along the surfaces of the article to be cooked, by motion downwardly around the bottom of the baffle-like or partitioning heating element, and upwardly through the cooking compartment and outwardly through an opening which serves for the introduction of the article. Means is also provided for substantially preventing entry of air adjacent the lower portion of the heating chamber.

Features of the invention include the details of construction relating to the circulation feature, along with the ideas of means for circulating the air in the manner set forth to accomplish proper cooking, with a substantially reduced amount of current, and obtain even distribution of heat throughout the surfaces to which heat is applied.

Features and advantages of the invention will be set forth in the description of the drawings forming a part of this application, and in said drawings.

Figures 1, 2:
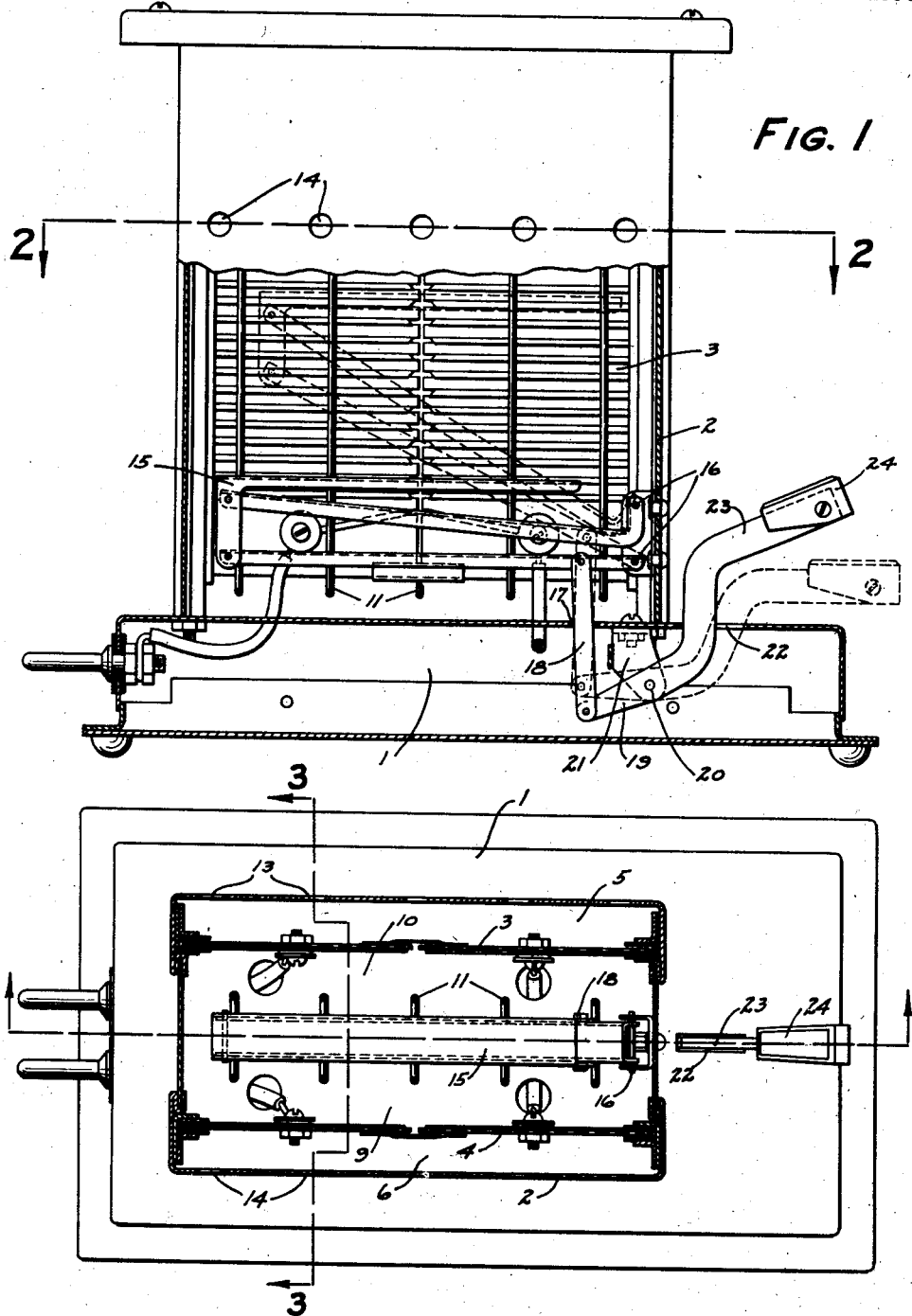
Figure 1 is a vertical section illustrating the arrangement of the food-carrying support.
Figure 2 is a plan section on line 2—2 of Figure 1; illustrating the partitioning arrangement of the heating elements.
Figure 3:
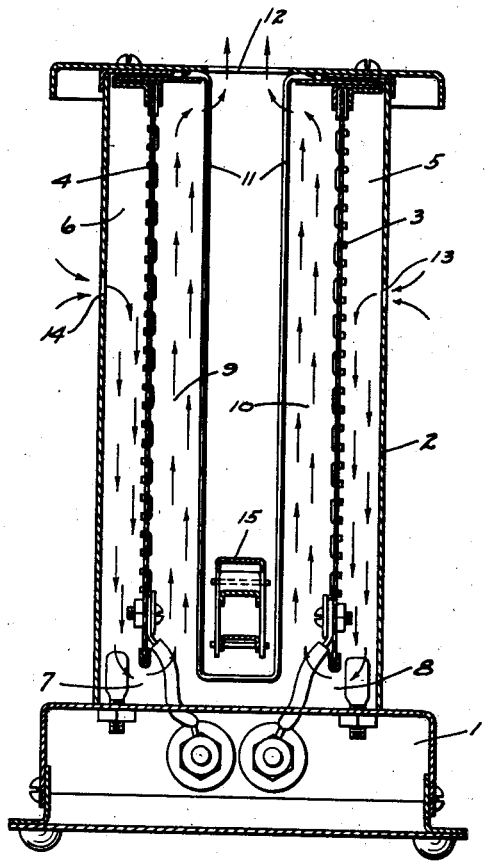
Figure 3 is a vertical section on line 3—3 of Figure 2 further illustrating the arrangement of the baffling and partitioning elements as well as the main feature of this invention which relates to the manner of circulating the air.

The device provides a substantially closed base casing 1 upon which is mounted a casing 2 as a heating chamber, the bottom of the casing being closed by the top wall of the base casing 1. The casing 2 forms a chamber within which are arranged two plate-like heating element mounts, generally designated 3—4 which are spaced as best shown in Figure 3, to divide the casing 2 into three vertically elongated compartments, two laterally arranged compartments 5—6 and a central food-receiving compartment. Each of the heating elements includes a mica sheet having the usual heating wires mounted thereon, and these elements are so disposed as to form baffles. The top edge of each sheet engages the top of the casing 2 and the vertical edges engage the corresponding vertical walls of the casing. The lower edges of the sheets are spaced from the bottom wall of the casing, or in this instance form the top wall of the casing base 1. The two opposed vertical walls of the casing 2, from which are spaced the faces of greatest area of the heating elements, are provided with openings 13 and 14, in this instance a single horizontal row of openings, for each vertical side, see Figures 1 and 2 for the row formation. A single opening of the proper area may be employed. These openings are arranged at a level above the slot-like openings 7 and 8 formed by spacing the lower ends of the heating elements above the top wall of the base, but are arranged below the level of the top of the casing 2. The top of the casing 2 is provided with a substantially centrally arranged slot-like opening 12 through which the article to be cooked is introduced. This opening forms part of the air circulating system, and is elongated in a direction parallel to the face sides of the heating elements.

It will be seen, by an inspection of Figure 3, that the heating elements are so arranged as to cause air (when the heating elements are operating) to be taken in at the openings 13—14, and drawn downwardly and through the spaces 7 and 8, to rise at the opposite sides of the heating elements into the spaces 9—10 at opposite sides of the article to be cooked. The article to be cooked is held spaced from the heating elements by a series of U-shaped grid-forming loops 11, and the upward circulation of air is between the heating elements and the article to be cooked and outwardly through the opening 12. Means generally designated 15 is provided for supporting the article to be cooked and for raising it through the opening 12, for removal from the cooker or toaster. Part of this structure forms no part of the present invention. A feature of the structure which does form a part of this invention, relates to the manner of connecting the movable support and operating it so that the least possible quantity of air is admitted at the lower part of the heating chamber. This means, claimed herein, includes elements which are pivoted at points 16 to a bracket held by one of the vertical walls of the casing 2. These elements are operated substantially in the manner of lazy tongs by means of a link 18 passing through a small opening 17 in the top of the base 1. This link is pivoted at one end to the lowermost of the lazy tong elements, and its opposite end is pivoted to one arm 19 of a lever which is pivoted at 20 to a bracket 21 carried by the top wall of the base 1. The other arm 23 of the lever extends through an opening 22 in the top of the base, and is provided with a suitable finger piece 24. On depression of the lever to the point shown in dotted lines, the food elevating device assumes the position shown in dotted lines in Figure 1.

It is to be noted that the arm of the operating lever 23 does not pass through a vertical wall of the casing 2, but downwardly through the opening 22. It will be further noted that the link 18 passes through a small opening 17. In this way, substantially no air is allowed to enter at the bottom of the casing 2, so that the through-circulation of air is substantially controlled by the openings 13, 14 and 12.

It has been found by tests, that by limiting the quantity of admitted air the time required for cooking is decreased, and the cooking operation is accomplished with less current consumption.

All details of construction are claimed with the exception of the lazy tongs feature of the support, but the invention includes the arrangement of the support-operating lever, and the link connection 18 by which the support can be operated with the admission of only a minimum amount of air at the bottom of the heating chamber, and without passing the lever through a vertical wall of the casing 2.

I claim as my invention:

1. A device of the class described comprising a heating chamber having air intake openings in its vertical walls, and heating element supports arranged to compel the air entering said openings to circulate downwardly beneath the heating element supports and then upwardly between them, the top wall of the chamber having an opening permitting introduction between said elements of an article to be cooked, and facilitating upward circulation of air, said openings constituting substantially the sole means whereby air is admitted to or expelled from the heating chamber.

2. A device of the class described comprising a heating chamber having heating element supports dividing the chamber into two outer compartments and a central compartment, the outer walls of the outer compartments having air intake openings, said supports being arranged to compel the air entering said openings to circulate downwardly beneath them and then upwardly through the central compartment, and the top wall of the chamber having an opening in opposition to the central compartment permitting introduction between the supports of an article to be cooked, and facilitating exit of heated air from between the supports said openings constituting substantially the sole means whereby air is admitted to or expelled from the heating chamber.

3. A device of the class described comprising a heating chamber having heating element supports dividing the chamber into two outer compartments and a central compartment, each of two of the outer walls of the outer compartments having a row of air intake openings arranged at a level well above the bottom of the heating chamber, said supports being arranged to compel the air entering said openings to circulate downwardly beneath them and then upwardly through the central compartment, the top wall of the chamber having an opening in opposition to the central compartment permitting introduction between the supports of an article to be cooked, and facilitating exit of heated air from between the supports, said openings constituting substantially the sole means whereby air is admitted to or expelled from the heating chamber.

4. A device of the class described comprising a heating chamber having air intake openings in its vertical walls and heating elements supports arranged to compel the air entering said openings to circulate downwardly beneath the heating element supports and then upwardly between them, the top wall of the chamber having an opening permitting introduction between the supports of an article to be cooked, means between the heating element supports for supporting an article, and means for moving the support to remove the article, no part of which means passes through a vertical wall of the heating chamber, said opening constituting substantially the sole means whereby air is admitted to or expelled from the heating chamber.

5. A device of the class described comprising a vertically disposed heating chamber, having heating elements spaced therein to divide the chamber into two outer and a central compartment, the edges of the heating elements engaging all walls but the bottom wall, but being spaced from the bottom of the chamber to provide for intercommunication between the compartments, and openings in the walls of said chamber adjacent the top of the outer compartments for permitting the entry of air into the outer compartments, for circulation beneath the heating elements and upwardly through the central compartment, the top wall of the chamber being open above the central compartment to permit introduction of the article to be cooked, means within the central compartment for supporting the article to be cooked, and means for operating the support to remove the article after cooking, said means including a lever accessible at the outside of the chamber but not passing through the vertical wall thereof.

6. A device of the class described comprising a heating chamber having an opening at its top to receive the article to be cooked, a food support, a heating element support one at each side of the food support, and acting as circulation baffles and having only their bottoms spaced from any wall of the chamber so as to compel circulation therebeneath, the heater faces of said supports being opposed to and spaced from corresponding faces of the outer walls of the chamber, each wall so opposed having means for admitting a limited amount of air, the food-receiving opening and the last means forming substantially the sole means for entry and exit of air into and out of said cooking chamber.

7. A device of the class described comprising a heating chamber having a central opening at its top to receive the article to be cooked, a food support, a heating element support one at each side of the food support and laterally of the opening and acting as circulation baffles and extending downwardly from the top toward bottom and having their bottoms only spaced from any wall of the chamber so as to compel circulation therebeneath, the heater faces of said supports being opposed to and spaced from corresponding faces of the outer walls of the chamber, each wall so opposed having means for admitting a limited amount of air, the food-receiving opening and the last mentioned means forming substantially the sole means for the entry and exit of air into and out of said cooking chamber.

8. A device of the class described comprising a heating chamber having an opening at its top to receive the article to be cooked, a food support below the opening and opposed thereto, a heating element support one at each side of the food support and opening and acting as circulation baffles and extending downwardly from the top toward bottom and spaced only from the bottom wall of the chamber so as to compel circulation beneath their bottoms only, and opposed to and spaced from corresponding vertical outer walls of the chamber, each wall so opposed having a single row of air inlet openings for admitting a limited amount of air, the food-receiving opening and the last mentioned openings forming the sole means for the entry and exit of air into and out of said cooking chamber.

9. A device of the class described comprising a heating chamber having an opening at its top through which the article to be cooked is introduced, imperforate heater supports arranged at opposite sides of the opening and having their lower edges spaced from the bottom of the chamber, each support having a heating element on its inner face, openings in those walls which are opposed to the outer faces of the heating element supports for limiting the entry of air, the supports being so arranged that the entering air is caused to travel downwardly at the outer side of each of the supports and upwardly between the supports and past the heaters thereon toward said food-introducing opening, said openings forming the sole means for entry and exit of air into and out of the chamber.

In witness whereof, I have hereunto set my hand this 31st day of January 1930.

EVEN J. ROHNE.